(No Model.) 7 Sheets—Sheet 2.

T. CARNEY.
CASH REGISTER, INDICATOR, AND RECORDER.

No. 484,297. Patented Oct. 11, 1892.

Witnesses
Martin H. Olsen.
John L. Tunison

Inventor
Thomas Carney
By Edward Rector
his Atty.

(No Model.) 7 Sheets—Sheet 4.

T. CARNEY.
CASH REGISTER, INDICATOR, AND RECORDER.

No. 484,297. Patented Oct. 11, 1892.

Witnesses:
Martin H. Olsen
John L. Tunison

Inventor:
Thomas Carney
by Edward Rector
his Attorney.

(No Model.) 7 Sheets—Sheet 5.

T. CARNEY.
CASH REGISTER, INDICATOR, AND RECORDER.

No. 484,297. Patented Oct. 11, 1892.

Witnesses:

Inventor:
Thomas Carney
by Edward Rector
his Attorney.

(No Model.) 7 Sheets—Sheet 6.
T. CARNEY.
CASH REGISTER, INDICATOR, AND RECORDER.
No. 484,297. Patented Oct. 11, 1892.
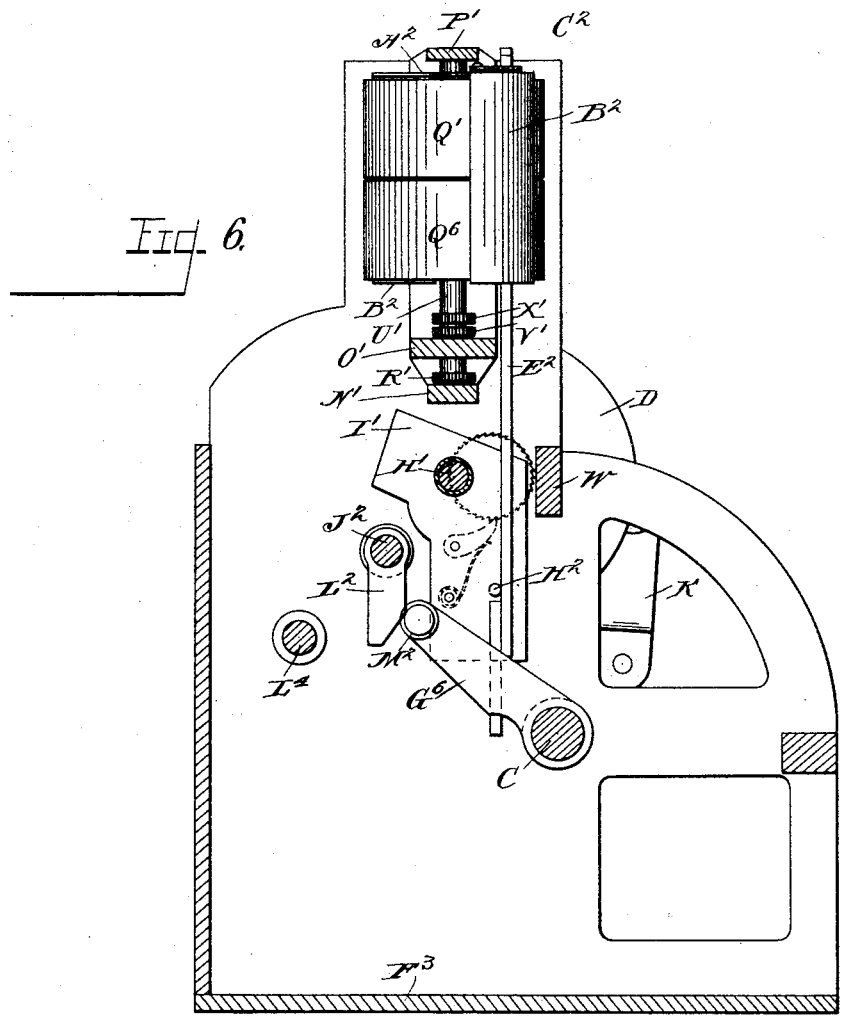
Witnesses:
Martin H. Olsen.
John L. Tunison.
Inventor:
Thomas Carney
by Edward Rector
his Attorney.

(No Model.) 7 Sheets—Sheet 7.

T. CARNEY.
CASH REGISTER, INDICATOR, AND RECORDER.

No. 484,297. Patented Oct. 11, 1892.

Witnesses
Martin H. Olsen
John L. Tunison

Inventor
Thomas Carney
By Edward Rector
his Atty.

United States Patent Office.

THOMAS CARNEY, OF DAYTON, OHIO, ASSIGNOR TO THE NATIONAL CASH REGISTER COMPANY, OF SAME PLACE.

CASH REGISTER, INDICATOR, AND RECORDER.

SPECIFICATION forming part of Letters Patent No. 484,297, dated October 11, 1892.

Application filed June 10, 1892. Serial No. 436,246. (No model.)

*To all whom it may concern:*

Be it known that I, THOMAS CARNEY, a citizen of the United States, residing at Dayton, in the county of Montgomery and State of Ohio, have invented certain new and useful Improvements in Cash Registers and Indicators, of which the following is a description, reference being had to the accompanying drawings, forming part of this specification.

The novelty of my invention consists in new constructions, arrangements, and combinations of parts, all as will be hereinafter set forth, and specifically pointed out in the claims.

Figure 1:
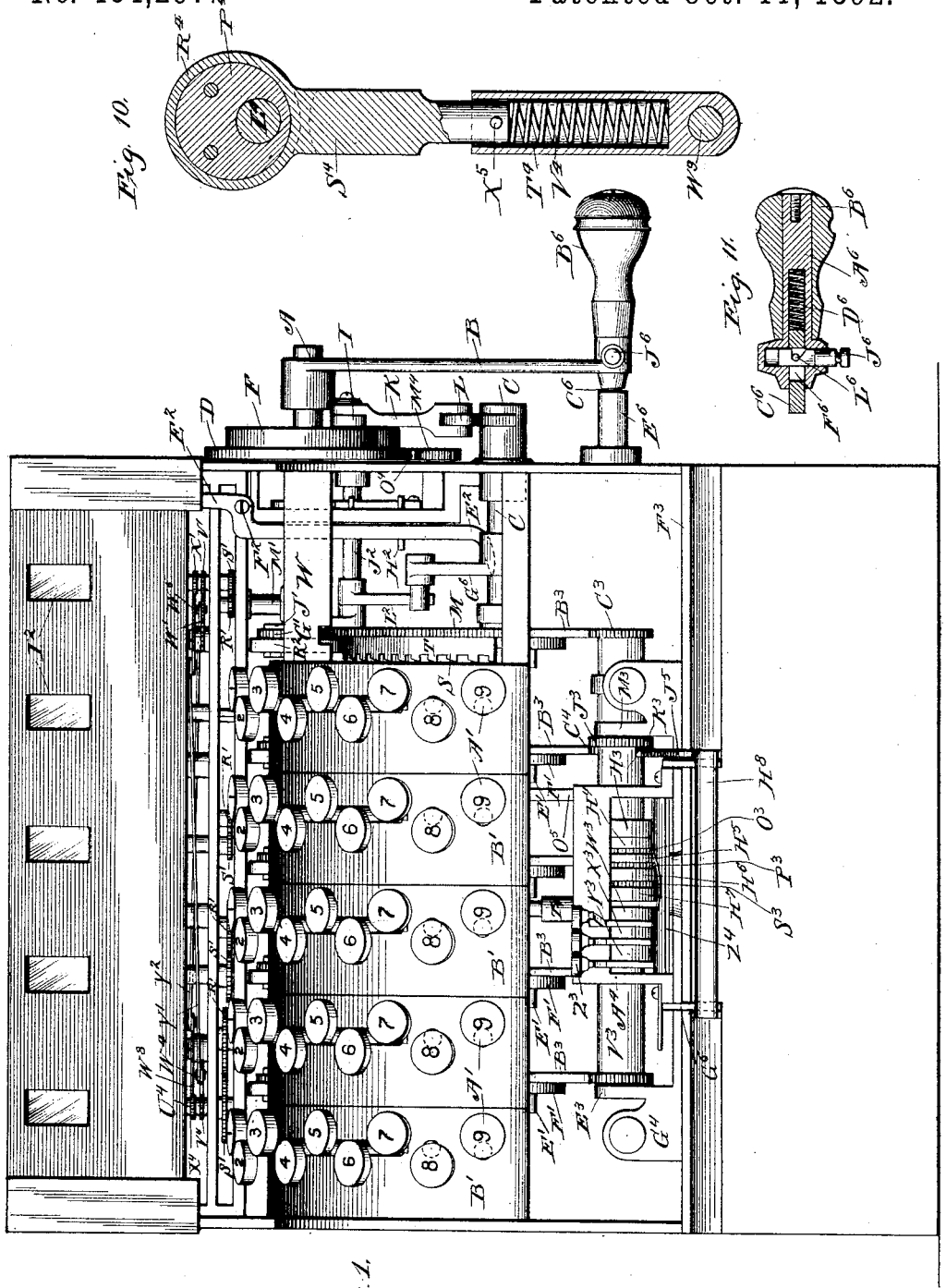
Figure 2:
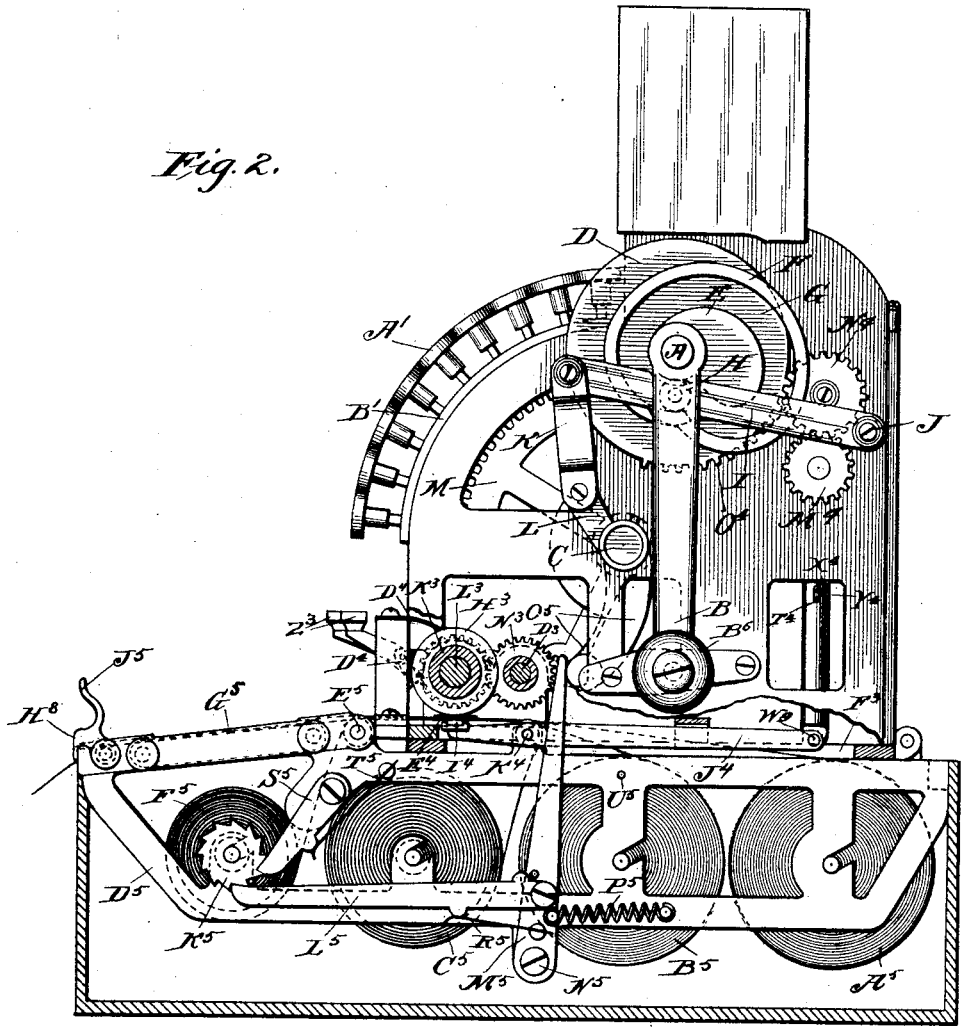
Figure 3:
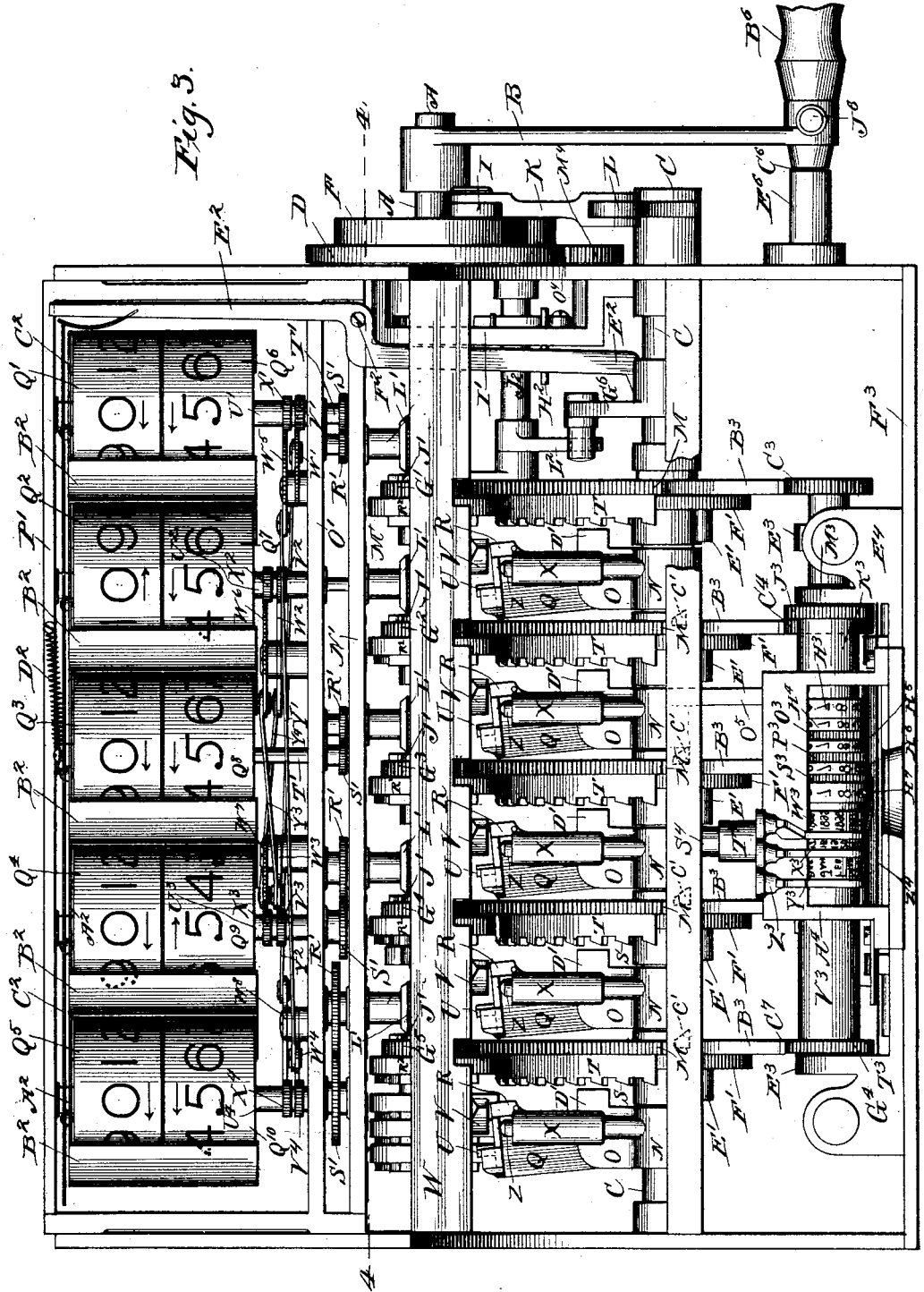
Figure 4:
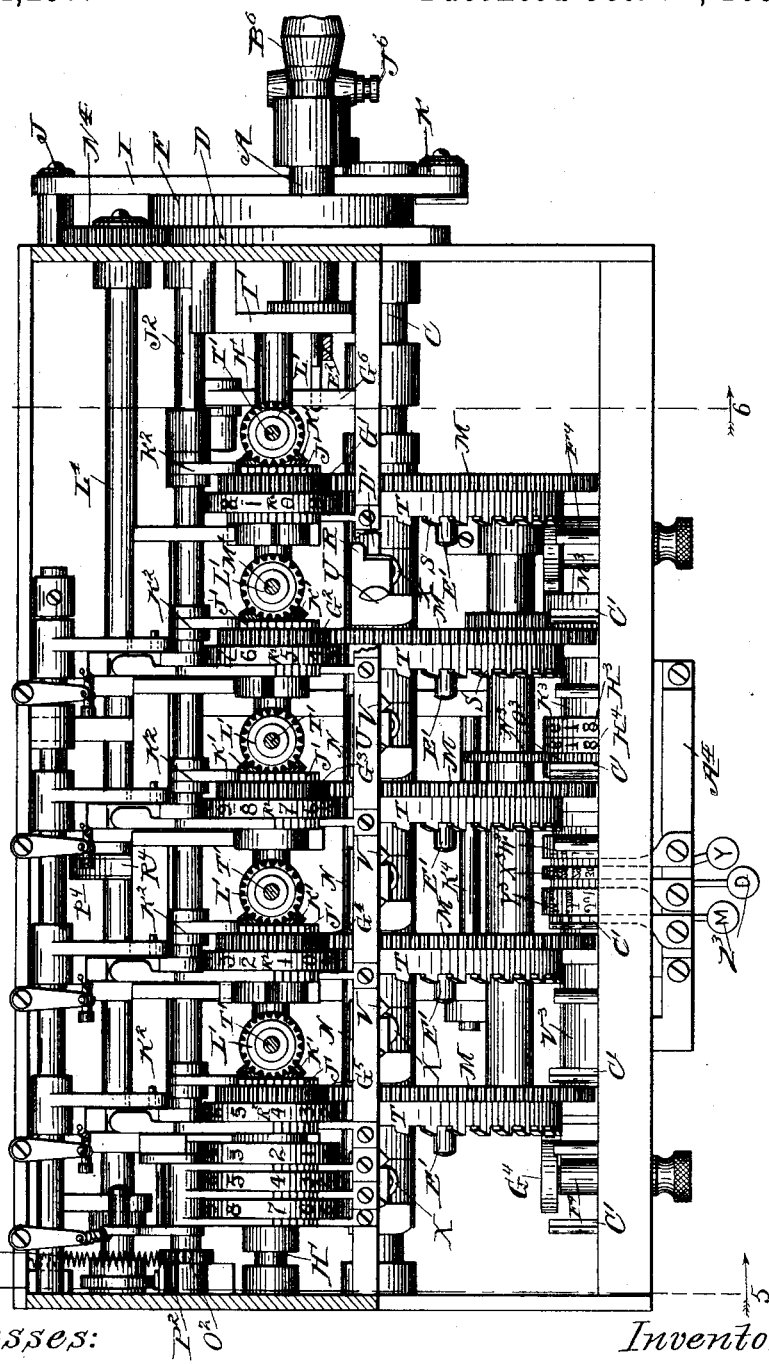
Figure 5:
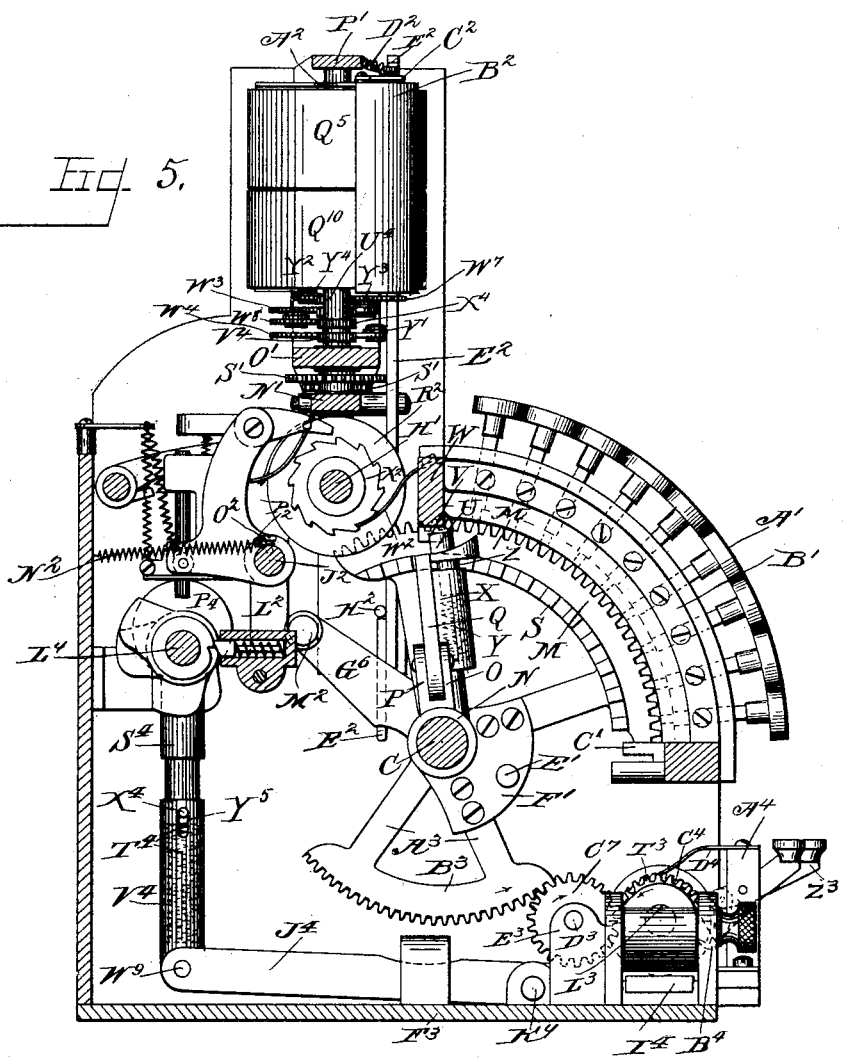
Figure 12:
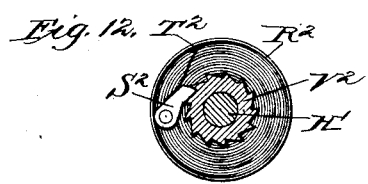
Figure 7:
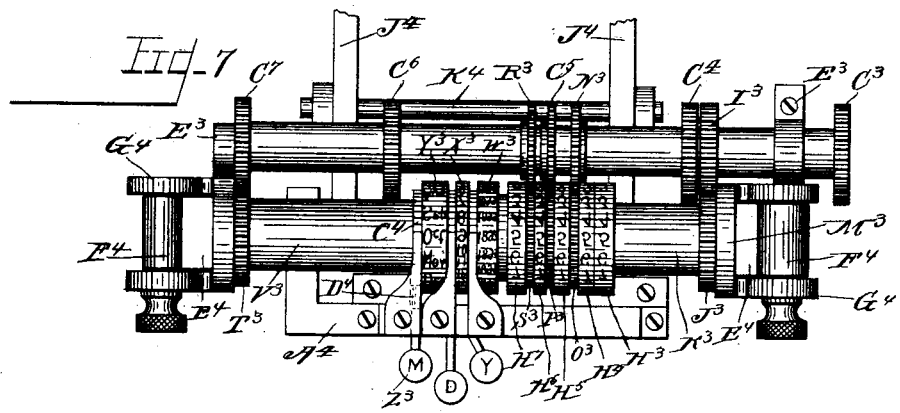
Figure 8:
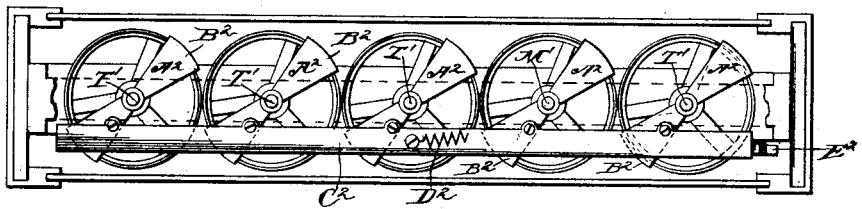
Figure 9:
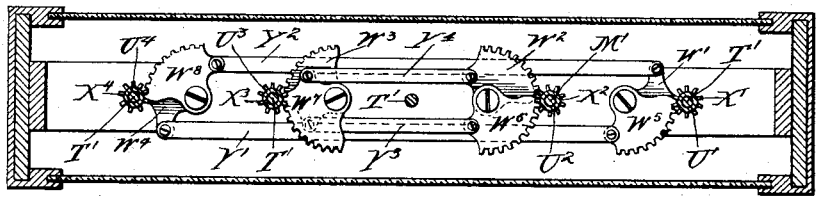

In the accompanying drawings, Figure 1 represents a front elevation of the complete machine with portions of the casing removed to expose the parts within; Fig. 2, a side view of the right side of the machine, the upper portion in elevation and the lower portion in section; Fig. 3, a front elevation of the machine removed from its casing and base and drawn to a larger scale than the views in Figs. 1 and 2; Fig. 4, a horizontal section on the line 4 4 of Fig. 3; Fig. 5, a vertical section on the lines 5 5 of Fig. 4, with the key-plates and keys in position; Fig. 6, a vertical section on the line 6 6 of Fig. 4; Fig. 7, a top plan view of the printing-wheels and associated parts; Fig. 8, a top plan view of the indicator-cylinder; Fig. 9, a plan view of the segments and connecting-links immediately below the indicator-cylinders; Fig. 10, Sheet 1, an enlarged sectional detail of the eccentric and connection for actuating the impression-platen; Fig. 11, a horizontal section of the knob of the operating-handle; Fig. 12, Sheet 5, a sectional detail of one of the registering-wheels, showing the pawl carried by it and the ratchet carried by the pinion at the right of the wheel.

The same letters of reference are used to indicate identical parts in all the figures.

My new machine belongs to that class which employs a driving mechanism for the indicators and register, in combination with a series of banks or rows of stops or keys, the driving mechanism having a uniform movement at each operation of the machine, and the series of stops or keys operating to determine the extent of movement which shall be imparted to the indicators and register. In the machine shown in the drawings there are employed five rows of keys, Fig. 1, nine keys in each row. The keys in each row represent the nine digits, the uppermost key in the row representing "1" and the lowermost key "9." Beginning on the right the first row of keys represents units of cents, the second tens of cents, the third units of dollars, the fourth tens of dollars, and the fifth hundreds of dollars. By means of these five rows of keys and their co-operating mechanisms the machine is capable of indicating and registering any desired amount (excepting fractions of cents) from one cent to nine hundred and ninety-nine dollars and ninety-nine cents, inclusive. There are five indicators, one co-operating with each row of keys and each bearing the nine digits. The main driving mechanism consists of a revoluble shaft A, Figs. 1, 2, 3, and 4, to which an operating-handle B is applied, and a rock-shaft C, which is oscillated forward and back by each revolution of the shaft A in the manner and by the means to be described. Fast upon the shaft A, just outside of the right-hand side frame of the machine, Figs. 1 and 2, is a circular disk D. Formed upon or secured to the outer face of this disk is a cam E, Fig. 2, and a surrounding ring F conforming to the shape of the periphery of the cam and leaving a cam groove G between them. Fitting into this groove is a friction-roller H, mounted on a stud projecting inward from the side of a lever I, which is pivoted at its rear end to a stud upon the framework at J, and has pivoted to its front end the upper end of a link K, whose lower end is pivoted to the end of an arm L, fast upon the end of the rock-shaft C. It results from this construction that whenever the shaft A is given a complete revolution the forward end of the lever I will be first moved downward and then upward, and the shaft C thereby oscillated forward and back. Heretofore in machines of this character the rock-shaft has generally been actuated by a revoluble shaft through the medium of a crank-and-pitman connection; but I have provided the means above described for this purpose to cause the rock-shaft to be moved at different rates of speed during different portions of its forward-and-backward stroke and to enable me to regulate its speed during different portions of its stroke in accordance with the character of the work to be done.

Loosely mounted upon the rock-shaft C, and held from longitudinal movement thereon by suitable collars or other devices, are five gear-toothed segments M, one to the right of each of the rows of keys. Fast upon the shaft C, one to the left of each segment, are five hubs N, Figs. 3, 4, and 5, each having two upwardly-extending integral ears or plates O P, Fig. 5, between which is pivoted the lower end of a rocking plate Q, whose upper end projects forward at right angles to the body of the plate. The upper right-hand corner of each plate Q is shaped to form a tooth R, Figs. 3 and 4, which is adapted to co-operate with teeth S, formed in the edge of a segmental flange T on the side of the adjacent segment M, each of the segments being provided with one of said toothed flanges. Formed upon the upper end of each plate Q is a lug U, which co-operates with the row of keys standing in line with it and also with a beveled lug V upon the under side of a cross-bar W of the framework. Formed integral with and extending upward from the plate or ear O of each of the hubs N, Figs. 3 and 5, is a tubular housing X, which contains a coiled spring Y, dotted lines, Fig. 5, and a plug Z. The latter has a pointed upper end which bears against the under side of the top of the plate Q. The engagement of this spring-plug with the plate Q serves to yieldingly hold the latter in the several positions to which it may be rocked on its pivotal support, and, if desired, the under side of the plate may be provided with shallow recesses to co-operate with the pointed end of the plug. When the machine is at rest and the parts in normal position, the tubular housings X stand in approximately-vertical position and the upper ends of the plates Q are thrown to the left, as seen in Fig. 3, and yieldingly held in that position by the spring-plugs. In this position of the plates Q the lugs U upon their upper ends stand immediately to the left of the vertical planes of the respective rows of keys, so that as the shaft C is oscillated forward and downward at the beginning of an operation of the machine, the lugs U will travel along the left-hand sides of the rows of keys. The keys A′ consist of short pins mounted in segmental guides B′ and having numbered push-buttons secured to their outer ends. To enable the buttons to be made as large as possible consistent with the length of the row of keys the row of buttons is staggered, each alternate button being secured to its key-stem near the left-hand rim of the button, and the others to their keys near the right-hand edges of their rims, as shown. The keys are frictionally held in their guides, so that when pushed inward they remain in until pushed out again, and vice versa. In their outer positions their inner ends do not project inward far enough to be engaged by the lugs U, even when the latter are brought into the vertical planes of the rows of keys; but when any key is pushed inward its inner end will stand in the path of travel of the lug U. As before stated, in its forward and downward movement each lug U will travel to the left of its row of keys, and will therefore clear the inner end of any key which may have been pressed in; but just as the shaft C completes its forward stroke the left-hand side of the upper end of the plate Q will engage a beveled lug C′, projecting rearward from a front cross-bar of the framework, Figs. 4 and 5, and the plate will be thrown toward the right into what may be called its "middle" position, and the lug U brought into line with the row of keys. As the shaft C now moves backward to normal position the left-hand rounded side of the lug U will engage the operated key, and as it passes it the plate Q will be forced still farther to the right and its tooth O engaged with one of the notches between the teeth S on the flange T of the segment. This will couple the segment to the shaft C, and the latter will carry the segment with it during the remainder of its return stroke, at the completion of which the lug U will engage the beveled lug V on the under side of the cross-bar W, and the plate Q will be thrown to the left again and its tooth R disengaged from the segment. At the next forward movement of the shaft C a lug D′, projecting from the right-hand side of the plate O, which carries the tubular housing X, will engage a pin E′, Figs. 3, 4, and 5, projecting from the left-hand side of a plate F′, secured to the hub and one of the radial arms of the segment, and will thus pick up the segment and carry it forward to the position shown in the drawings. The segment will be left in this position at the return backward stroke of the parts unless some key in the row corresponding with it has been operated, in which event the plate Q will be thrown to the right by the engagement of its lug U with such key, and its tooth R engaged with the segment in the manner before described.

It will be understood from the foregoing description that at each operation of the machine all of the segments which have been moved at the preceding operation are picked up and carried forward to the positions shown in the drawings, and all of them are left in such position excepting those corresponding to the rows containing the newly-operated keys. It will also be noticed that the extent of movement of each segment is determined by its point of connection with the driving mechanism, and that these points of connection are controlled by the different keys. The indicators and register, hereinafter described, are geared to and driven by the segments, and the adjustment of the parts and the relative positions of the keys in their respective rows are such that each key when operated will cause the driving mechanism to be connected with its segment at such point that the movement given the segment will indicate and register exactly the value of such key.

Meshing with the respective segments M are five pinions G', $G^2$, $G^3$, $G^4$, and $G^5$, Figs. 3 and 4, loosely mounted upon a shaft H', mounted at its right-hand end in a bracket I', secured upon the framework, and at its left-hand end in a bearing upon the opposite side frame of the machine. Fast upon the right-hand side of each of the pinions there is in this instance a ratchet-wheel J', for a purpose to be explained, while fast upon the right-hand side of each of these ratchets is a beveled pinion K'. Each of these beveled pinions meshes with a beveled pinion L', fast upon a vertical spindle M', Fig. 4, journaled at its lower end in the shaft H' and at its upper end in crossbars N' O' of the framework. The second spindle from the right extends up through the cross-bars N' and O', and is journaled at its upper end in a top cross-bar P' of the framework, Fig. 3. It has fast upon its upper end an indicating cylinder or drum $Q^2$, which has the nine digits arranged in order around its face. The other spindles M' are short and have fast upon them, between the cross-bars N' O', pinions R', which mesh with pinions S', fast upon the lower ends of vertical spindles T', Fig. 9, which are journaled at their upper ends in the top cross-bar P' and carry indicating-cylinders Q', $Q^3$, $Q^4$, and $Q^5$, similar to the cylinder $Q^2$, before mentioned.

It will be understood from the foregoing description that each of the indicating-cylinders Q' $Q^2$, &c., is geared to one of the segments M' and moves in unison therewith, so that the extent of movement of the segment, and consequently the value of the operated key, is always indicated by the cylinder geared to it. The numbers on these indicators are exposed to view through reading-openings $I^2$ in the forward side of the machine, Fig. 1. For the purpose of simultaneously exposing an indication at the rear side of the machine, so that persons standing at either side may observe the indications, I provide a second set of indicating-cylinders $Q^6$, $Q^7$, $Q^8$, $Q^9$, and $Q^{10}$, mounted upon the respective spindles T' immediately below the cylinders Q' $Q^2$, &c. These lower cylinders, with the exception of the middle one $Q^8$, are carried by sleeves U', $U^2$, $U^3$, and $U^4$, Figs. 3 and 9, loosely mounted upon their respective spindles, and the cylinders Q', $Q^2$, $Q^4$, and $Q^5$ are geared respectively to the cylinders $Q^{10}$, $Q^9$, $Q^7$, and $Q^6$, so that the spindles Q' and $Q^{10}$, representing units of cents, turn together, as do the cyliders $Q^2$ and $Q^9$, representing tens of cents, $Q^4$ and $Q^7$ representing tens of dollars, and $Q^5$ and $Q^6$ representing hundreds of dollars. The middle cylinders $Q^3$ and $Q^8$ both represent units of dollars, and they are therefore fastened upon the same spindle and turn together. The numbers upon the upper cylinders are so arranged that when a number is exposed at one side of the machine the same number upon its corresponding cylinder will be exposed at the opposite side of the machine. The geared connection between the respective cylinders of the upper and lower set may be described as follows, reference being had to Figs. 3 and 9: The spindle M', which carries the indicator $Q^2$, and each of the spindles S', excepting the middle one, which carries the indicator $Q^3$, has fast upon it, above the cross-bar O', a pinion V' to $V^4$, Fig. 3. Pivotally supported upon studs projecting upward from the bar O' are eight gear-toothed segments W' to $W^8$, the lower four of which W' to $W^4$ mesh, respectively, with the pinions V' to $V^4$, which are fast on the spindles M' of the first, second, fourth, and fifth indicators. The upper four segments $W^5$ to $W^8$ mesh, respectively, with pinions X' to $X^4$, fast upon the lower ends of the sleeves U' to $U^4$, Fig. 9, which carry the four indicators $Q^6$, $Q^7$, $Q^9$, and $Q^{10}$ of the lower set. The four lower segments W' to $W^4$ are connected, respectively, with the upper segments $W^5$ to $W^8$ by means of four links Y' to $Y^4$, so that the respective segments move together. Through the medium of these segments and connecting-links the movement given each of the indicators Q', $Q^2$, $Q^4$, and $Q^5$ in the upper set is transmitted to the corresponding indicator in the lower set, as will be readily understood.

Combined with each two indicators, which are mounted upon the same spindle as the indicators Q' and $Q^6$, $Q^2$ and $Q^7$, &c., is a double oscillating screen. These screens are composed of supporting-plates $A^2$, Fig. 8, loosely mounted upon the upper ends of the spindles which carry the indicators of the upper set, and extending diametrically across the indicating-cylinders, and each having depending from it two vertical screen-plates $B^2$, curved to fit the surface of the cylinder. All of these screens are connected by a horizontal plate $C^2$, which is pivoted to the supporting-plates $A^2$ of the screens, so that all of said screens will be moved together. The plate $C^2$ has connected to it a spring $D^2$, which tends to move it to the right and carry the screen-plates $B^2$ to positions directly in front and in rear of the indicators, and thereby hide the numbers thereon; but the plate $C^2$ is held to the left against the stress of the spring $D^2$, to expose the numbers on the indicators by means of a lever $E^2$, Figs. 1 and 3 to 6, pivoted to the cross-bar N' of the framework at $F^2$, Fig. 3. The lower end of this lever (or a plate secured to its lower end) is bent to the left beneath an arm $G^6$, fast on the rock-shaft C. In the normal position of the parts when the machine is at rest the engagement of the arm $G^6$ with the beveled upper surface of this bent end of the lever $E^2$ holds the lower end of said lever to the right and its upper end thrown to the left to the position shown in the drawings, in which position the upper end of the lever will hold the plate $C^2$ thrown to the left and all of the screens in position to expose the numbers on the indicators; but when the rock-shaft C is moved forward at the beginning of the operation of the machine and the arm $G^6$ thereby carried away from the lower end of the lever $E^2$, the spring $D^2$ will throw the plate $C^2$ to the right and carry all of the screens to positions immediately in front and in rear of the indicators and hide their numbers. Just at the completion of the operation of the machine and backward stroke of the rock-shaft C the arm $G^6$ will re-engage the lower end of the lever $E^2$ and throw it to the right, thereby moving its upper end and the plate $C^2$ to the left and carrying the screens back to the positions shown in the drawings, to expose to view the numbers upon the indicators which represent the indication. A pin $H^2$, Figs. 3 and 5, projects laterally from the side of the bracket $I'$ in rear of the lever $E^2$, and prevents the arm $G^6$ from forcing the lower end of said lever rearward when the arm $G^6$ engages it at the end of the backward stroke of said arm.

As seen in Fig. 1, the forward side of the casing of the machine is provided with a series of windows or reading-openings $I^2$, one immediately in front of each of the indicators $Q'$ $Q^2$, &c., of the upper set, through which openings the numbers upon the indicators are exposed, and between which openings and the indicators the screens above described are moved at the beginning of the operation of the machine. The rear side of the casing is provided with a similar series of windows immediately opposite the indicators $Q^6$ $Q^7$, &c., of the lower set.

Fast upon a rock-shaft $J^2$, journaled at its opposite ends in the side frames of the machine, Fig. 4, is a series of locking-dogs $K^2$, which co-operate with the ratchets $J'$, fast upon the sides of the pinions $G'$, heretofore described. Fast upon the shaft $J^2$, near its right-hand end, Figs. 3, 5, and 6, is a pendent arm $L^2$ in line with a friction-roller $M^2$, carried upon a stud on the side of the rear end of the arm $G^6$. When the machine is at rest and the parts in normal position, the friction-roller $M^2$ on the rear end of the arm $G^6$ engages the lower end of the arm $L^2$ and holds the shaft $J^2$ rocked forward and the locking-dogs $K^2$ in engagement with the ratchets $J'$; but when the machine is operated and the forward movement of the rock-shaft C carries the arm $G^6$ away from the arm $L^2$, a spring $N^2$, connected at its forward edge to a pin or screw $O^2$ upon the upper side of the shaft $J^2$ at its left-hand end, Figs. 4 and 5, will rock said shaft rearward until the pin $O^2$ engages a pin $P^2$, Fig. 4, projecting inward from the side frame of the machine, and will thus lift the locking-dogs $K^2$ out of engagement with the ratchets $J'$ and hold them out of engagement until the operation of the machine has been nearly completed and the arm $G^6$ re-engages the lower end of the arm $L^2$ and rocks the shaft $J^2$ again and throws the dogs $K^2$ into engagement with the ratchets $J'$. Thus at the completion of the operation of the machine the segments and indicators are positively locked in the positions to which they have been moved.

Fast upon the hub of each of the pinions $G'$ $G^2$, &c., to the left of the pinion, is a registering-wheel $R^2$, bearing upon its periphery a cipher and the nine digits. Fast upon the right-hand side of each of these registering-wheels, beneath the flange which forms its periphery, is a pawl $S^2$, Fig. 12, which is pressed by a spring $T^2$ into engagement with a ratchet $V^2$, fast upon the left-hand side of the adjacent pinion. It results from this connection of the pinions with the registering-wheels that as the pinions are turned forward by the backward movement of the segments M their ratchets will carry the registering-wheels with them and register the amounts indicated; but as the pinions are turned backward at the beginning of the next operation of the machine by the forward and downward movement of the segments the ratchets $V^2$ will slip idly under the pawls $S^2$, and the wheels $R^2$ will remain stationary. Spring-pawls $W^2$, Fig. 5, fastened to the cross-bar W of the framework and engaging ratchets $X^2$ fast upon the left-hand sides of the registering-wheels $R^2$, prevent backward movement of said wheels. Suitable transfer mechanism, which need not be here described in detail, is interposed between the respective registering-wheels to add the revolutions of each wheel upon the next-higher wheel, as is usual in this class of machines.

Fastened to the hub of each of the segments M by radial arms $A^3$, or formed integral therewith, is a second segment $B^3$, Fig. 5, approximately opposite the segment M, as seen in Figs. 1, 3, and 7. These lower segments $B^3$ mesh respectively with pinions $C^3$, $C^4$, $C^5$, $C^6$, and $C^7$, carried by sleeves upon a shaft $D^3$, mounted in brackets $E^3$ upon the bottom-frame plate $F^3$ of the machine. The pinions $C^3$, $C^4$, &c., are employed to drive a series of printing-wheels $H^3$, $H^4$, $H^5$, $H^6$, and $H^7$. The sleeve which carries the pinion $C^3$ has fast upon its opposite end a pinion $I^3$, which meshes with a pinion $J^3$, fast upon the right-hand end of a sleeve $K^3$, loose on a shaft $L^3$, Fig. 5, mounted at its right-hand end in a bracket $M^3$ and at its left-hand end in one of the brackets $E^3$, before mentioned. The sleeve $K^3$ has fast upon its left-hand end the type-wheel $H^3$, representing units of cents. The sleeve which carries the pinion $C^4$ has fast upon its left-hand end a pinion $N^3$, which meshes with a pinion $O^3$, fast upon the left-hand side of the second type-wheel $H^4$, representing tens of cents. The pinion $C^5$, which is driven by the middle one of the segments $B^3$, meshes directly with a pinion $P^3$, fast upon the left-hand side of the third type-wheel $H^5$, representing units of dollars. The sleeve which carries the pinion $C^6$ has fast upon its right-hand end a pinion $R^3$, which meshes with a pinion $S^3$, fast upon the left-hand side of the fourth type-wheel $H^6$, representing tens of dollars, and the pinion $C^7$ meshes with a pinion $T^3$, fast upon the left-hand end of a sleeve $V^3$, which has fast upon its right-hand end the fifth type-wheel $H^7$, representing hundreds of dollars. All of the type-wheels are geared to the respective segments and move in unison with the indicators, so that when the machine is operated to bring to the reading-openings any given numbers upon the indicators corresponding numbers on the type-wheels will be brought to the printing-point. Mounted upon the sleeve $V^3$, to the left of the type-wheels above described, are three dating-wheels $W^3$, $X^3$, and $Y^3$, the former bearing numbers representing years, the second numbers representing the days of the month, and the third abbreviations of the names of the months. These dating-wheels may be turned, to change the dates to be printed by them by means of short keys or levers $Z^3$, pivoted in the frame $A^4$ in front of said wheels and having pawls $B^4$ (dotted lines Fig. 5) hung on their rear ends and spring-pressed into engagement with ratchets $C^4$, Fig. 7, fast upon the sides of the wheels. The rear ends of spring-holding pawls $D^4$, secured upon the upper side of the frame $A^4$, engage the upper sides of the ratchets $C^4$ and prevent backward movement of the wheels. One or more inking-ribbons $E^4$, carried upon spools $F^4$, journaled between ears $G^4$ upon the sides of the brackets $M^3$ and $E^3$, are passed beneath the row of printing-wheels. An impression-platen $I^4$, Figs. 2 and 5, is carried upon the forward cross-bar of a frame $J^4$, whose side arms are hung upon a shaft $K^4$. The frame $J^4$ is actuated by a cam or eccentric, Figs. 5 and 10, upon a revoluble shaft $L^4$, journaled at its opposite ends in the side frames of the machine and extending across the rear of the machine, Fig. 4. The right-hand end of this shaft projects outside the right-hand side frame of the machine, and has fast upon it a gear $M^4$, Fig. 2, which meshes with a gear $N^4$, mounted upon a stud on the outer side of the frame. The gear $N^4$ meshes with a row of teeth $O^4$ upon the periphery of the disk D, heretofore described, and the proportions and adjustment of the parts are such that the teeth on the disk D will engage the gear $N^4$ and turn the latter and the gear $M^4$ and shaft $L^4$ one complete revolution during the last quarter of the revolution of the operating-handle B and disk D. A disk $P^4$, secured eccentrically upon the shaft $L^4$, near its middle, Fig. 10, is surrounded by a ring $R^4$, carried by the upper end of a rod or plunger $S^4$, whose lower end fits within a tubular housing $T^4$, containing a coiled spring $V^4$, confined between the lower end of the plunger $S^4$ and the bottom of the bore in the housing $T^4$. The lower end of the housing $T^4$ is pivoted to the rear cross-rod $W^9$ of the frame $J^4$. A pin $X^5$ is passed transversely through the lower end of the plunger $S^4$ and projects at each side through slots $Y^5$ in the housing $T^4$. It results from this construction that just before the stroke of the operating-handle is completed, during the last quarter thereof, the rear end of the frame $J^4$ will be depressed and its forward end, carrying the platen $I^4$, be thrown upward to press the platen (or the interposed inking-ribbons and paper strips or tickets) against the type-wheels, to print the amount which has been indicated and registered at that operation of the machine.

The printing mechanism above described may be employed to print the amounts of the sales upon paper tickets inserted from the front of the machine between the platen $J^4$ and type-wheels, and in Fig. 1 there is shown an opening $Z^4$, between the upper and lower guide-plates, in which such tickets may be inserted for that purpose; but I prefer to employ this mechanism more particularly for printing the amounts of the sales upon a series of paper strips carried in rolls in the lower part of the machine, as seen in Fig. 2, and led from said rolls between the impression-platen and type-wheels, from which latter point one of the strips is led back into the machine and wound upon a storage-reel to preserve a record of each sale, while the others are led over a writing-tablet where the different items constituting the sale may be written upon the upper one and duplicated upon the lower ones by means of interposed manifolding material, and the strips then torn off to form detached checks. In Fig. 2 there are shown three rolls of these paper strips $A^5$, $B^5$, and $C^5$, journaled in a frame $D^5$, hinged at its rear upper corner to the base-plate of the machine and detachably secured thereto at its forward end in some suitable manner. From the rolls $A^5$, $B^5$, and $C^5$ the paper strips are led over the roller or shaft at $K^4$, which may be the same shaft upon which the frame $J^4$ is pivoted, and are led thence forward across the platen $I^4$ and between the inking-ribbons $E^4$, passing transversely beneath the type-wheels. From this printing-strip the lower strip, from the roll $C^5$, is led over the roller $E^5$ and thence down around a storage-reel $F^5$, journaled in the forward side of the frame $D^5$. The two upper strips from the rolls $A^5$ and $B^5$ are led from the printing-point over a table or writing-tablet $G^5$ upon the upper forward side of the frame $D^5$, where a suitable transfer-sheet (not shown) is interposed between the two strips, to cause the items entered upon the upper strip with a pencil to be duplicated upon the lower strip in the usual manner. A knife-bar $H^5$, having a serrated tearing-edge, is hinged by side arms at either end to the sides of the table $G^5$ at its forward upper corner, and the strips of paper are led beneath this bar, which has a handle $J^5$, by which it may be swung upward to permit the strips to be drawn forward by hand and then swung downward to confine them between its tearing-edge and the forward end of the table, so that they can be torn off.

The storage-reel $F^5$ has fast upon it a ratchet $K^5$, which is engaged by the forward end of a pawl-arm $L^5$, which is pivoted at its end to a lever $M^5$, whose lower end is pivoted to the side of the frame $D^5$ at $N^5$, and whose upper end extends up between the side arms of the frame $J^4$ into position to be engaged by the lower end of an arm $O^5$, fast upon the rock-shaft C, heretofore described. A spring $P^5$, connected at its forward end to the lever $M^5$ and at its rear end to the side of the frame $D^5$, tends to pull the lever rearward; but in the normal position of the parts the engagement of the lower end of the arm $O^5$ with the upper end of the lever prevents rearward movement of the latter. A flat spring $R^5$, secured to the lever $M^5$, bears against the under side of the pawl-arm $L^5$ and holds its forward end up in engagement with the ratchet of the storage-reel. A holding-pawl $S^5$, pivoted to the frame $D^5$, and pressed by a spring $T^5$ into engagement with the ratchet of the storage-reel, prevents backward movement of the latter.

Under the construction and arrangement of the parts above described the mode of operation of the machine is as follows: When a sale is made, the clerk enters the various items thereof and such other memoranda as is desired upon the outer strip above the table $G^5$, and the matter written upon this strip is duplicated by the transfer-sheet upon the lower strip. The clerk next presses in the proper keys in the several rows to indicate and register the total amount of the items of the sale and then gives the operating-handle a complete revolution. This will cause the indicators to expose to view the numbers representing the amount of the sale, and its full value will be added upon the registering-wheels. There will also be printed upon the three paper strips passed beneath the type-wheels the gross amount of the sale and the year, month, and day thereof. The clerk next throws up the knife-bar $H^8$ by means of its handle $J^5$, grasps the ends of the two paper strips which have rested beneath said bar, and pulls forward the strips until the date and numbers printed upon them by the type-wheels are brought in front of the knife-bar. He then depresses the latter and tears off the strips against its edge, thereby producing two detached checks, each having written upon it the various items of the sale and other desired memoranda, and having also printed upon it the date and the total of all the items. At the beginning of the operation of the machine the forward movement of the rock-shaft C will have carried the arm $O^5$ rearward, thereby permitting the spring $P^5$ to pull the lever $M^5$ rearward until arrested by a stud $U^5$ upon the side of the frame $D^5$ and drawing the forward end of the pawl-arm $L^5$ backward into engagement with a new notch in the ratchet $K^5$. When the shaft C was rocked backward to normal position, the arm $O^5$ re-engaged the upper end of the lever $M^5$ and moved it and the pawl-arm $L^5$ back to normal position and caused the latter to turn forward the storage-reel and wind upon it the portion of the record-strip drawn from the roll $C^5$.

The remaining feature of my invention relates to the operating-handle by which the main driving-shaft of the machine is given its revolutions. As seen in Figs. 1 and 11, this handle B carries at its lower end upon a laterally-projecting spindle $A^6$ the usual grasping-knob $B^6$. In a bore in the left-hand portion of the spindle $A^6$ is fitted a sliding rod $C^6$, between the right-hand end of which and the inner end of the bore is confined a spiral spring $D^6$, which normally forces the rod $C^6$ to the left, in which position the end of the rod projects through the vertical plane of the outer end of a stud or stop-lug $E^6$ upon the framework. The rod $C^6$ has a slot $F^6$ cut through it near its middle, and a pin $L^6$ is passed through the rod and slot transversely of the latter. This pin fits in a notch in the side of a rod $J^6$, fitted to slide in a suitable guideway in the lower end of the handle and passing through the slot $F^6$ in the rod $C^6$. One side of the notch in the rod $J^6$ is beveled to form a cam-surface, which co-operates with the pin $L^6$. In the normal position of the parts the left-hand end of the rod $C^6$ rests immediately behind the stop $E^6$. When the machine is to be operated, the operator grasps the knob $B^6$ and with his thumb presses in the rod $J^6$, whereupon the beveled side of the notch in the latter, bearing against the pin $L^6$, will force the rod $C^6$ to the right against the pressure of the spring $D^6$ and withdraw its left-hand end from the plane of the stop $E^6$, whereupon the handle is free to be moved forward. Heretofore in machines of this character the operating-handle has usually been provided with a sliding grasping-knob whose spindle co-operated with a stop-lug on the frame to arrest the handle when it had been given a complete revolution. In such machines the grasping-knob was slid outward away from the framework to disengage its spindle from the stop-lug and permit the handle to be revolved, a suitable spring operating to slide the handle back to normal position and bring the end of the spindle into position to engage the stop-lug when the revolution of the handle was completed. The objection to this construction is that the operator is liable to inadvertently hold the knob slid to its outward position during the entire operation of the machine, or if he does not do that he is liable to accidentally move it to that position during the operation of the machine, so that when the handle comes around to normal position the end of its spindle will not be in position to engage the stop-lug upon the frame and the handle will be moved too far.

In the construction which I employ the grasping-knob of the handle does not slide toward and from the frame to carry the end of its spindle into and out of position to engage the stop-lug, and the rod $C^6$ is with-drawn from the plane of the stop $E^6$ solely by pressure upon the rod $J^6$. This pressure can be conveniently applied only when the handle is in approximately its normal position of rest. After it has been moved from such position in the operation of the machine the thumb of the operator slips off the end of the rod $J^6$ and the spring $D^6$ immediately throws the rod $C^6$ to the left, and there is no danger then of its being accidentally moved to the right again.

In another pending application, Serial No. 430,203, filed April 22, 1892, I have shown and described part of the machine covered by this application, and certain novel features of construction shown and described, but not claimed, in this application are claimed in my aforesaid application.

Having thus fully described my invention, I claim—

1. In a cash register and indicator, the combination, with the indicators, of a set of type-wheels adjusted simultaneously with the indicators to bring to the printing-point type-numbers corresponding to the numbers exposed upon the indicators, a platen co-operating with the type-wheels, a check-strip and a record-strip led between the platen and type-wheels, a writing-tablet in front of the printing-point over which the check-strip is led from the printing-point, and means for severing said strip at the forward end of the tablet after it has been written upon, a storage-reel upon which the record-strip is wound after it has been printed upon by the type-wheels, and actuating devices or driving mechanism for the indicators, type-wheels, platen, and storage-reel.

2. In a cash register and indicator, the combination of the indicators, a set of type-wheels adjusted simultaneously with the indicators to bring to the printing-point type-numbers corresponding to the numbers exposed upon the indicators, a platen co-operating with the type-wheels, two check-strips and a record-strip carried in supply-rolls within the machine and led between the platen and type-wheels, a writing-tablet over which the check-strips are led from the printing-point, manifolding material between said strips upon said tablet, and means for severing the checks from the strips after they have been written upon, a storage-reel upon which the record-strip is wound after it passes the printing-point, and actuating devices or driving mechanism for the indicators, type-wheels, platen, and storage-reel.

3. In a cash register and indicator, the combination of the rock-shaft C, the oscillating segments M, mounted thereon, means for coupling them to and uncoupling them from the shaft C, the indicators geared to the segments M, the segments $B^3$, movable with the respective segments M, the type-wheels geared to the segments $B^3$, and a platen co-operating with the type-wheels.

4. The combination of the rock-shaft C, an oscillating segment M, loosely mounted thereon and having teeth S, a hub N, fast on the shaft C and having the ear or plate O projecting from it, the plate Q, pivoted to the plate O and provided with the lug U, the tubular housing X, carried by the plate O and containing the spring Y, and the plug Z, co-operating with the plate Q, and the cams V and C' and keys A', co-operating with the plate Q, substantially as described.

5. In a cash-indicator, the combination of the two sets of indicators mounted on vertical spindles, the oscillating screen-plates $B^2$, co-operating therewith upon opposite sides of the indicators, the plate $C^2$, connecting all of the screens, the spring $D^2$, connected with said plate, and a connection between the plate $C^2$ and the driving mechanism of the machine, whereby the screens are oscillated back and forth to alternately hide and expose the numbers on the indicators, substantially as described.

6. In a cash-indicator, the combination of the indicating-cylinders mounted on vertical spindles, the oscillating screen-plates $B^2$, supported by cross-plates $A^2$, mounted upon the indicator-spindles, the plate $C^2$, pivoted to the plates $A^2$, the spring $D^2$, connected to the plate $C^2$, the lever $E^2$, the rock-shaft C, and the arm $G^6$ thereon, co-operating with the lever $E^2$, substantially as described.

7. In a cash-indicator, the combination of the indicators $Q'$, $Q^2$, $Q^4$, and $Q^5$, fast on the vertical spindles $T'$, the indicators $Q^6$, $Q^7$, $Q^9$, and $Q^{10}$, carried by sleeves $U'$, $U^2$, $U^3$, and $U^4$, loose upon the spindles $T'$, the pinions fast upon said spindles and sleeves, the pivoted segments $W'$ to $W^8$, meshing with the pinions, and the links $Y'$ to $Y^4$, connecting the respective segments, for the purpose described.

8. In a cash-indicator, the combination of the rock-shaft C, the oscillating segments M, loose thereon, means for connecting and disconnecting the shaft and segments, the pinions $G'$, meshing with the segments, the ratchets $J'$, turning with the pinions, the rock-shaft $J^2$, the locking-dogs $K^2$, fast thereon and co-operating with the ratchets $J'$, the arm $L^2$, fast on the shaft $J^2$, and the arm $G^6$, fast on the shaft C and co-operating with the arm $L^2$, substantially as and for the purpose described.

9. The combination of the rock-shaft C, the segments M, loose thereon, means for connecting and disconnecting them, the revoluble driving-shaft A, the disk D, fast thereon and provided with the cam-groove G, the lever I, carrying a stud fitting in said groove, the arm L, fast on the shaft C, and the link K, connecting the arm L and lever I, substantially as described.

10. The combination of the type-wheels, the platen $I^4$, co-operating therewith and carried by the frame $J^4$, the housing $T^4$, carried by the frame $J^4$, the revoluble shaft $L^4$, the disk $P^4$, eccentrically secured thereon, the rod $S^4$, carrying at its upper end the ring $R^4$, surrounding the disk $P^4$ and fitting at its lower end in the housing $T^4$, and the spring $V^4$, confined in said housing beneath the rod $S^4$, substantially as described.

11. The combination of the type-wheels, the impression-platen, the record-strip led from the supply-roll $C^5$ between the platen and type wheels, the storage-reel therefor, provided with the ratchet $K^5$, the pawl $L^5$, lever $M^5$, spring $P^5$, rock-shaft C, and the arm $O^5$, fast on said shaft and co-operating with the lever $M^5$, substantially as described.

12. The combination of the type-wheels, the platen co-operating therewith, the check-strips and record-strip led from the rolls $A^5$, $B^5$, and $C^5$ between the type-wheels and platen, the writing-tablet $C^5$, over which the check-strips are drawn from the printing-point, the hinged knife-bar $H^8$ at the forward edge of said tablet, the storage-reel for the record-strip, having the ratchet $K^5$, and a pawl co-operating with the ratchet to turn the storage-reel and wind up the record-strip at each operation of the machine.

13. The combination of the operating-handle having the laterally-projecting spindle $A^6$, the sliding rod $C^6$, fitted in a bore within the spindle and provided with a slot $F^6$ and pin $L^6$, extending across said slot, the spring $D^6$, acting on the rod $C^6$, rod $J^6$, co-operating with the pin $L^6$, and the stop $E^6$, co-operating with the rod $C^6$, substantially as described.

14. The combination of the handle B, having the laterally-projecting spindle $A^6$, the grasping-knob $B^6$, carried thereby, the sliding rod $C^6$, fitted in a bore in the spindle $A^6$ and having a slot $F^6$ and transverse pin $L^6$, the spring $D^6$, the rod $J^6$, passed through the slot $F^6$ and provided with a notch co-operating with the pin $L^6$, and the stop $E^6$, co-operating with the rod $C^6$, substantially as described.

THOMAS CARNEY.

Witnesses:
   JOS. P. CLEAL,
   THOMAS CORWIN.